United States Patent
Alexander, Jr. et al.

[19]

[11] Patent Number: 5,870,589
[45] Date of Patent: Feb. 9, 1999

[54] METHOD FOR ENHANCED BROADCAST AND UNKNOWN SERVER OPERATION

[75] Inventors: Cedell Adam Alexander, Jr., Durham; John Kevin Frick; Matthew Blaze Squire, both of Raleigh; Edward Joel Rovner, Chapel Hill, all of N.C.

[73] Assignee: International Business Machines Corporation, Armonk, N.Y.

[21] Appl. No.: 899,024

[22] Filed: Jul. 23, 1997

[51] Int. Cl.$^6$ .............................. G06F 13/14; G06F 9/44
[52] U.S. Cl. .............. 395/500; 395/200.62; 395/200.65; 395/800.11; 370/351
[58] Field of Search ............................... 395/500, 200.62, 395/200.65, 200.63, 800.1, 800.11; 370/351, 401, 463

[56] References Cited

U.S. PATENT DOCUMENTS

| | | |
|---|---|---|
| 4,701,910 | 10/1987 | Ulug . |
| 4,860,280 | 8/1989 | Gerhart . |
| 5,313,455 | 5/1994 | Van Der Wal et al. . |
| 5,317,563 | 5/1994 | Oouchi et al. . |
| 5,390,175 | 2/1995 | Hiller et al. ............................. 370/60 |
| 5,432,713 | 7/1995 | Takeo et al. . |
| 5,473,599 | 12/1995 | Li et al. ................................... 370/16 |
| 5,570,360 | 10/1996 | Klausmeier et al. . |
| 5,610,910 | 3/1997 | Focsaneanu et al. .................... 370/351 |
| 5,611,046 | 3/1997 | Russell et al. ........................ 395/200.1 |
| 5,764,895 | 6/1998 | Chung ................................... 395/700.8 |

*Primary Examiner*—Kevin J. Teska
*Assistant Examiner*—Thai Phan
*Attorney, Agent, or Firm*—John J. Timar; Andrew J. Dillon

[57] ABSTRACT

Provided are a method and system for achieving enhanced performance in communications involving one or more emulated networks overlaid onto at least one base network, where the emulation is performed by one or more network emulation servers-broadcast and unknown servers. The objects of the method and system are achieved via the following. Monitoring addresses of data transiting the one or more network emulation servers-broadcast and unknown servers where such monitored addresses are indicative of one or more functions provided by the one or more emulated networks. Tracking the monitored addresses. Comparing the tracked addresses, indicative of on or more functions provided by the one more emulated networks, with one or more prespecified thresholds indicative of monopolization of resources of the at least one emulated network. And, taking corrective action when the aforementioned comparing of addresses indicates that one or more entities associated with the tracked addresses are monopolizing resources of the at least one emulated network such that communications involving the at least one emulated network are enhanced.

17 Claims, 7 Drawing Sheets

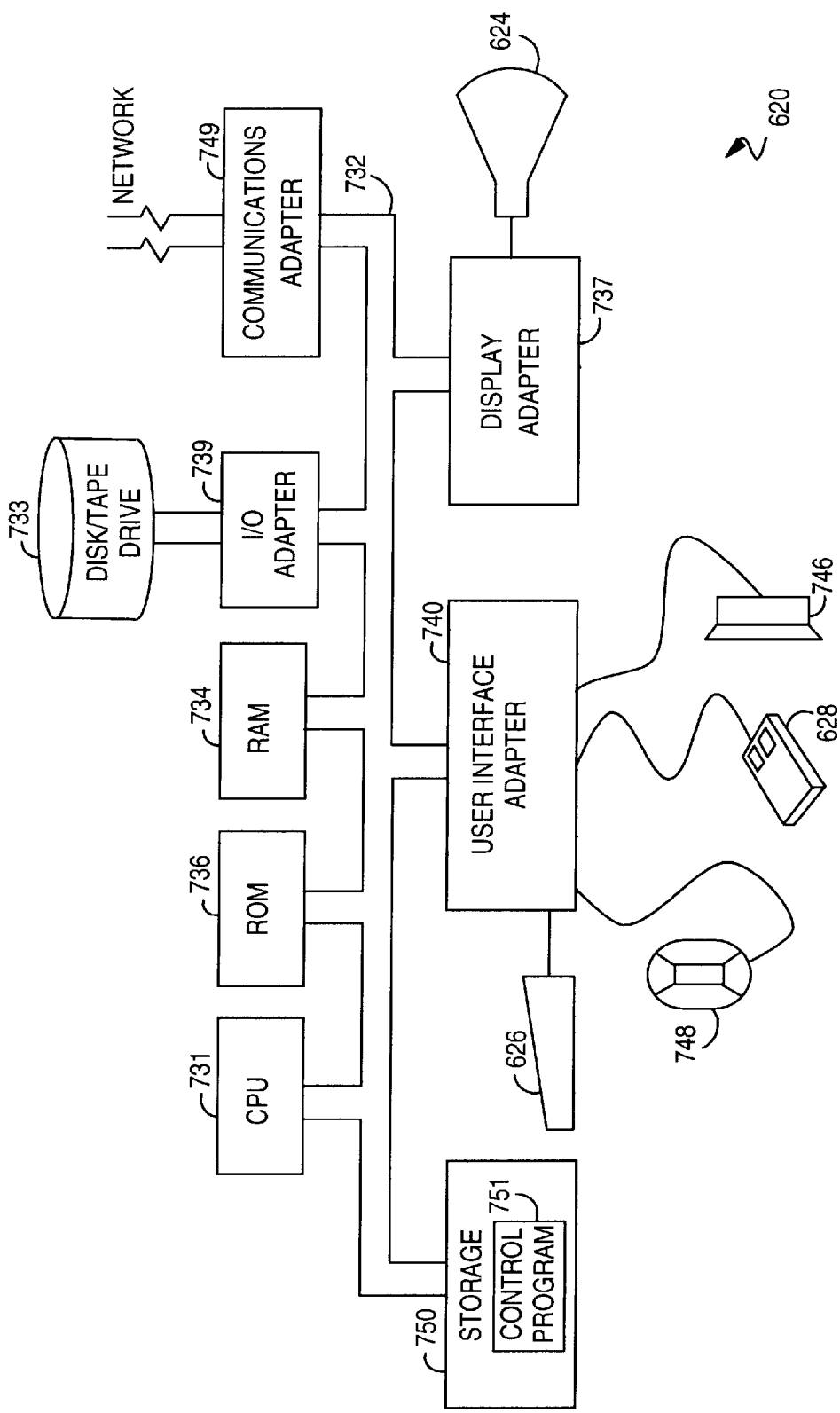

METHOD FOR ENHANCED BROADCAST AND UNKNOWN SERVER OPERATION

BACKGROUND OF THE INVENTION

1. Technical Field

The present invention is related to a method and system to be utilized in data communications. In particular, the present invention is related to a method and system to be utilized in data communications involving at least one data communications network. Yet still more particularly, the present invention is related to a method and system, to be utilized in data communications involving at least one data communication network wherein at least one emulated data communication network resides, and which significantly reduces the possibility of loss of network efficiency arising from monopolization of the at least one data communications network by one or more stations utilizing the at least one emulated network.

2. Description of the Related Art

Data communications is the transfer of data from one or more sources to one or more sinks that is accomplished (a) via one or more data links between the one or more sources and one or more sinks and (b) according to a protocol. Weik, *Communications Standard Dictionary* 203 (3rd ed. 1996). A data link is the means of connecting facilities or equipment at one location to facilities or equipment at another location for the purpose of transmitting and receiving data. Weik, *Communications Standard Dictionary* 206 (3rd ed. 1996). A protocol, in communications, computer, data processing, and control systems, is a set of formal conventions that govern the format and control the interactions between two communicating functional elements in order to achieve efficient and understandable communications. Weik, *Communications Standard Dictionary* 770 (3rd ed. 1996).

A data communications network is the interconnection of three or more communicating entities (i.e., data sources and/or sinks) over one or more data links. Weik, *Communications Standard Dictionary* 618 (3rd ed. 1996).

Data communications networks connect and allow communications between multiple data sources and sinks over one or more data links. The concept of a data link includes the media connecting one or more data sources to one or more data sinks, as well as the data communications equipment utilizing the media. The Data communications networks utilize protocols to control the interactions between data sources and sinks communicating over the one or more data links. Thus, it follows that such protocols must take into account the data communications requirements of data sources and links desiring communication over the one or more data links, and the nature of the underlying one or more data links themselves, in order to ensure that the requirements of such data sources and sinks are met.

Since protocols are interrelated to both the technology of the underlying data links and the data source and sink communications requirements, data communications protocols tend to evolve over time, as both data link technology and data transmission requirements change. A good example of such evolution is the relatively recent emergence of the Asynchronous Transfer Mode (ATM) protocol in order to satisfy data communications network user requirements by the use of fast digital communications equipment.

Today's data communications network users often have widely varying data communications transmission and reception requirements over time. For example, at one point in time a user may desire to transfer computer files over a network, while at another point in time the same user may want to engage in real-time voice communications over the same network, while at yet another point in time the same user may want to transmit and receive high-resolution full motion video over the same network.

These varying user needs have greatly varying requirements as far as the underlying data networks are concerned. For example, real-time traffic such as voice and high resolution video can tolerate some loss but not delay, while non-real-time traffic such as computer data and file transfer may tolerate some delay but not loss. Furthermore, exactly when different types of traffic will occur is not known in advance, but tends to occur at random intervals. In other words, the data comes in bursts and must be transmitted at the peak rate of the burst (which may be quite high as in full motion video), but the average arrival time between bursts may be quite large and randomly distributed.

Asynchronous Transfer Mode (ATM) protocol has evolved in order to satisfy the foregoing and similar data communications requirements by use of emerging digital communications equipment. ATM is a communications protocol that (a) enables the transmission of voice, data, image, and video signals over wide area, high bandwidth communications systems; (b) provides fast packet switching in which information is inserted into small fixed size cells that are multiplexed and switched in a slotted operation, based upon header content, over a virtual circuit established immediately upon request for service; (c) has been chosen as the switching standard for broadband integrated services digital networks (BISDNs); (d) has variable transmission rates; (e) offers bandwidth on demand service, and (f) supports multiple concurrent connections over single communications lines. Weik, *Communications Standard Dictionary* 47 (3rd ed. 1996).

ATM is a type of fast packet switching protocol. A packet, in data communications, is a sequence of binary digits that has one or more of the following characteristics: (a) includes data, control signals, and possibly error control signals, (b) is transmitted and switched as a composite whole, (c) is arranged in a specific format, such as a header part and a data part, (d) may consist of several messages or may be part of a single message, (e) is used in asynchronous switched systems, and (f) is usually dedicated to one user for a session. Weik, *Communications Standard Dictionary* 690 (3rd ed. 1996). A fast packet switching protocol increases the speed of packet switching by eliminating overhead (i.e., information in a packet which is solely utilized for efficient and correct communications and has no information content of interest to the ultimate network user). Weik, *Communications Standard Dictionary* 690 (3rd ed. 1996). Thus, in ATM user data is divided into "chunks" (i.e., is "packetized") and then control information is added to those chunks to make sure that they arrive at the appropriate destination.

In an ATM protocol network fast packet switching protocol overhead is reduced by (1) allocating flow control (making sure that a network node's buffer capacity is not exceeded) and error control (making sure that information is not corrupted) to nodes within the network, and (2) providing different Quality of Service (with lower Quality of Services requiring less overhead) dependent upon requirements received from ATM protocol network users.

The ability of ATM to provide different Quality of Service is one of the greatest advantages of ATM. These different qualities of service allow data communications networks to carry, in an integrated way, both real-time traffic such as voice and high resolution video which can tolerate some loss but not delay, as well as non-real-time traffic such as computer data and file transfer which may tolerate some delay but not loss. Thus, ATM gives networks the ability to efficiently handle the widely variant network user data requirements referenced above.

ATM provides the mechanisms whereby widely varying user data demands may be satisfied without unduly consuming network communications resources. That is, ATM tends to maximize efficiency of the data communication network wherein it is used. Hence, there is tremendous pressure from the communications industry to move toward ATM protocol networks.

Unfortunately for the communications industry, there exists today a tremendous installed base of non-ATM protocol networks (e.g., Wide Area Networks (WANs), Local Area Networks (LANs), Internet Protocol Networks) which do not utilize ATM protocol. Furthermore, some of the non-ATM protocol networks have features, which ATM protocol networks do not provide but that user systems have come to rely upon and have been designed to utilize. Thus, while the communications industry desires to move toward ATM protocol networks for reasons mentioned previously, a large percentage of the industry's customer base has opposed such movement in that such customer base has previously invested in hardware and software designed for non-ATM protocol networks. Thus, a major problem faced by the industry is how to move toward ATM protocol networks without disturbing its existing installed customer base.

The communications industry has opted for an attrition strategy to solve this problem. Under this strategy, the industry has opted to move toward ATM protocol networks while simultaneously continuing to support the vast installed base of non-ATM protocol networks, and the network and link layer protocols operating on these networks. (The hope being that as new users come on line, they will utilize ATM protocol equipment and that as older systems are phased out, they will be replaced with ATM protocol systems.) The key to this strategy is empowering the ATM protocol networks to be able to support non-ATM protocols, and to be able to supply non-ATM features which users have come to expect and rely upon.

The communications industry has opted to provide such support and supply such features via various "overlay" schemes. While the specifics of any particular overlay implementation are complex, the general idea is relatively straightforward: any non-ATM capability will be provided by a (logically) separate protocol that is (logically) overlaid onto a base ATM protocol network. The (logically) overlaid protocol is then utilized to allow non-ATM protocol networks to interact with ATM protocol networks "as if" the ATM protocol networks, and entities within such ATM protocol networks, recognize the protocols and support the features of non-ATM protocol networks.

One of the more well-known overlay schemes involves emulating the function of one network protocol scheme within the ATM network itself. An example of such is Local Area Network Emulation.

Local Area Network (LAN) Emulating protocol overlay schemes are often utilized to create one or more emulated local area networks within one or more ATM protocol networks. Each emulated network is a logical construct which is maintained by a LAN Emulation Server (the specifics of LAN Emulation Servers will be described below in the detailed description). However, from the standpoint of computing systems utilizing emulated local area networks, such emulation is completely transparent. That is, such emulation allows the use of "off the shelf" applications designed to function with local area network hardware and software, and functions "as if" the emulated network were in fact a true, physical, local area network.

While the emulation is transparent from the standpoint of the user of the emulation, such is certainly not the case within the ATM protocol network itself. In many instances, a function that is easily accomplished within a physical LAN requires a tremendous amount of data processing and data communication within an ATM protocol network to emulate that function.

One example where such is true is that of LAN broadcast, wherein one station on the LAN transmits a message intended to be received by either all or a subset of multiple stations on the LAN. One example where such a broadcast function is possible is where a bus topology is being utilized on a particular physical LAN (e.g., a number of data sources and sinks connected to one physical path, such as twisted pair wire or co-axial cable). Thus, when a station on the bus LAN transmits over the medium, all stations on the LAN can "hear" it since all data sources and sinks are connected to the same physical path and thus a transmission from one reaches all virtually simultaneously.

As has been discussed, ATM protocol networks are packet switched networks. That is, when one ATM source or sink transmits over a data link, it's transmission is not correspondingly "heard" or received by all stations on the ATM protocol network. Consequently, when an ATM protocol network provides emulation of the broadcast function, the ATM protocol network must produce multiple redundant packets addressed to the stations on the emulated LAN and deliver these packets in such a fashion that it appears to the stations utilizing the emulated LAN that a broadcast over physical LAN has occurred.

Such emulation thus can prove exceedingly intensive both from a data processing and data communications bandwidth consumption standpoint. Also, due to the fact that such emulation is exceedingly processing and communications intensive, it is very possible that one or more stations could greatly decrease the efficiency of the ATM protocol network providing the emulation if such stations over utilized the broadcast emulation and thereby monopolized network resources.

Thus, it is apparent from the foregoing, that a need exists for a method and system which retain the flexibility and power of the foregoing noted network emulation overlay schemes, and yet significantly reduce the possibility of loss of network efficiency arising from monopolization of the one or more underlying base networks by one or more stations utilizing the network emulation.

SUMMARY OF THE INVENTION

It is therefore one object of the present invention to provide a method and system to be utilized in data communications.

It is therefore another object of the present invention to provide a method and system to be utilized in data communications involving at least one data communications network.

It is yet still another object of the present invention to provide a method and system, to be utilized in data communications involving at least one data communications network wherein at least one emulated network resides, and which significantly reduce the possibility of loss of network efficiency arising from monopolization of the at least one data communications network by one or more stations utilizing the at least one emulated network.

The foregoing objects are achieved as is now described. Provided are a method and system for achieving enhanced performance in communications involving one or more emulated networks overlaid onto at least one base network, where the emulation is performed by one or more network emulation servers-broadcast and unknown servers. The objects of the method and system are achieved via the following. Monitoring addresses of data transiting the one or more network emulation servers-broadcast and unknown servers where such monitored addresses are indicative of one or more functions provided by the one or more emulated networks. Tracking the monitored addresses. Comparing the tracked addresses, indicative of one or more functions provided by the one more emulated networks, with one or more prespecified thresholds indicative of monopolization of resources of the at least one emulated network. And, taking corrective action when the aforementioned comparing of addresses indicates that one or more entities associated with the tracked addresses are monopolizing resources of the at least one emulated network such that communications involving the at least one emulated network are enhanced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is an illustration of a representative hardware environment which can be utilized in accordance with the method and system of an illustrative embodiment of the present invention.

DETAILED DESCRIPTION OF ILLUSTRATIVE EMBODIMENT

Figure 1:
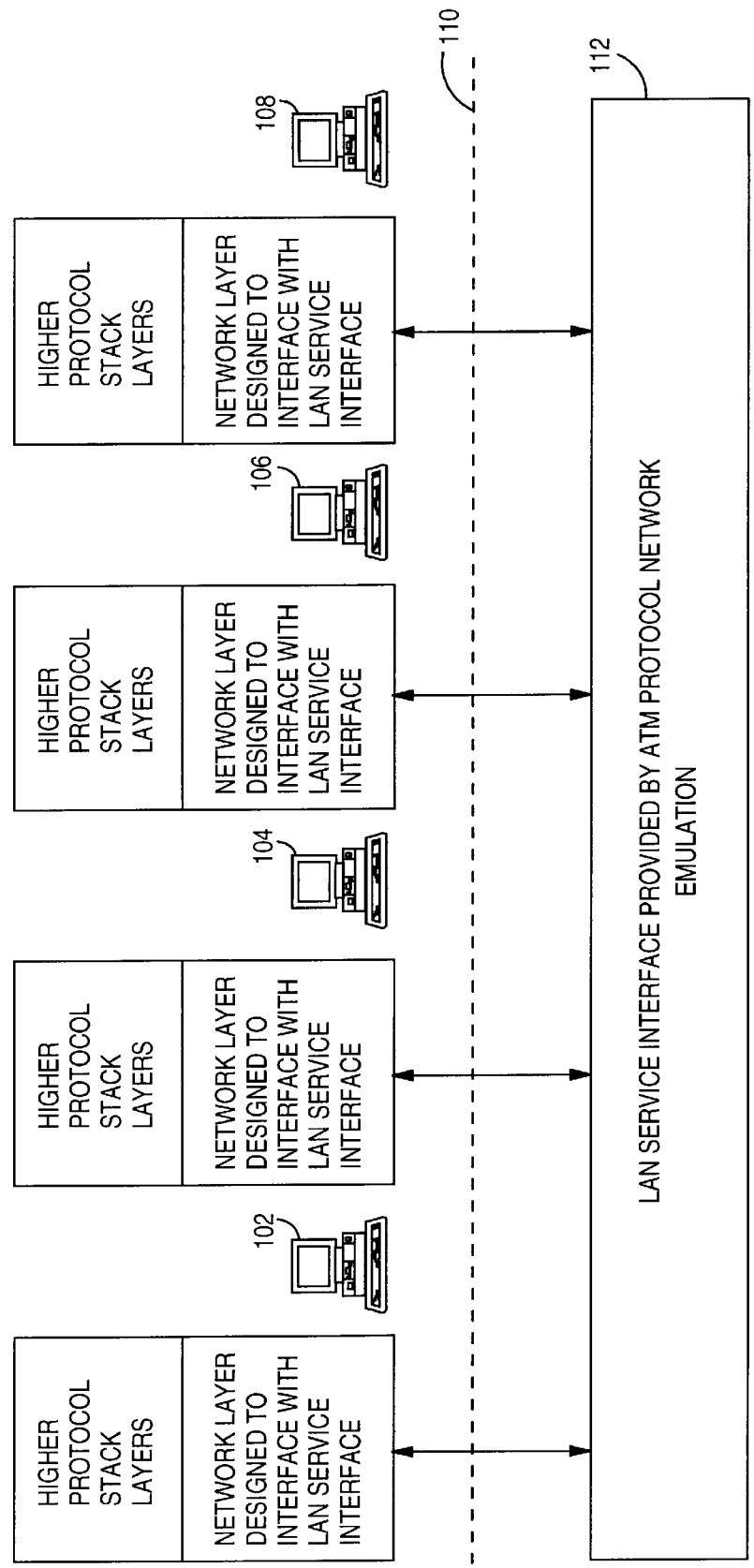
FIG. 1 illustrates how an ATM protocol network running LANE appears from the standpoint of computers utilizing a Local Area Network.

The following involves discussion of specific ATM protocols known in the art. Those skilled in the art will recognize that any specific discussion of ATM networks necessarily requires use of a number of acronyms and ATM specific concepts. Following, brief descriptions of acronyms utilized will be given. Those requiring more detailed descriptions of the acronyms are referred to the ATM references well known to those within the art.

The following presents a detailed description of an illustrative embodiment of the proposed method and system to be utilized with Local Area Network Emulation systems. Those skilled in the art will recognize that an illustrative embodiment of the present invention will function in any environment wherein a base data communications network is overlaid with any system which makes the base network appear and function as if the base network were in fact running protocols and providing functions different from those which the base network in actuality is running and providing. The following described illustrative embodiments are set forth to illustrate the concepts and principles involved in such functioning.

In the following detailed description, like parts are indicated by like numbers. Furthermore, the first digit of each reference numeral generally relates to the figure wherein the primary description of that reference numeral appears. For example, 1xx would have its primary description in relation to FIG. 1, 2xx in relation to FIG. 2, 3xx in relation to FIG. 3, and so forth.

There are different ways of running network layer protocols across an (overlay mode) ATM network, but one of the most popular is known as LAN Emulation (LANE). The LANE designation applies to a specific protocol by which local area networks are emulated, but those skilled in the art will recognize that LANE is representative of all emulation schemes which "overlay" one protocol scheme (e.g., a Local Area Network protocol) on top of a network running a different protocol scheme (e.g., an ATM protocol).

As the name suggests, the function of the LANE protocol is to emulate a local area network on top of an ATM network. The LANE protocol defines mechanisms for emulating well known LANs such as Ethernet and Token Ring LANs.

What LAN Emulation means is that the LANE protocol defines a service interface for higher layer (that is, network layer) protocols, which is identical to that of existing LANs, and that data sent across the ATM networks are encapsulated in the appropriate LAN MAC (medium access control) packet format. It does not mean that any attempt is made to emulate the actual media access control protocol of the specific LAN concerned (that is, CSMA/CD for Ethernet or token passing for Token Ring LANs).

In other words, the LANE protocols make an ATM network look and behave like an Ethernet or Token Ring LAN.

The rationale for doing this is that it requires no modifications to higher layer protocols to enable their operation over an ATM network. Since the LANE service presents the same service interface of existing MAC protocols to network layer software, no changes are required in such software.

The LANE protocol defines the operation of a single emulated LAN (ELAN). Multiple ELANs may coexist simultaneously on a single ATM network since ATM connections do not "collide." A single ELAN emulates either Ethernet or Token Ring. A single ELAN is composed of a LAN Emulation Server/Broadcast and Unknown Server (LES/BUS), and Lan Emulation Clients (LE Clients) of that LES/BUS.

As has been discussed, LANE allows machines running Local Area Network protocols to interface with and utilize ATM protocol networks via the network layer commands of the Local Area Network protocols. How this is accomplished will be illustrated below.

FIG. 1 illustrates how ATM protocol network LANE appears from the standpoint of computers utilizing such Local Area Network Emulation. It is assumed for sake of illustration that computers 102, 104, 106, and 108 are running some protocol stack with a network layer set up to interface with a standard Local Area Network protocol (such as Token Ring or Ethernet). In a normal, physical, Local Area Network, the network layer of a computer utilizing the Local Area Network communicates with other stations on the Local Area Network by presenting the Local Area Network address or addresses of the computers on the Local Area Network to the service interface provided by the local area network itself. The stations on the local area network are typically identified by Media Access Control (MAC) addresses, and thus the network layer indicates which one or more stations are to be contacted by presenting MAC addresses at this interface.

As is shown in FIG. 1, with LANE the operation is exactly the same. That is, computers 102, 104, 106, and 108 continue to run some protocol designed to interface with standard Local Area Network protocols. When one of computers 102, 104, 106, or 108 desires to communicate to one or more other computers it hands a MAC address into the ATM protocol network emulation service interface 112 "as if" that interface were the service interface of a standard local area network protocol. Subsequently, the ATM protocol network emulation service interface 112 responds in the same way as the service interface of whatever LAN is being emulated. Thus, from the standpoint of applications programs running on attached computers 102, 104, 106, and 108, the fact that an emulation is present is completely transparent. Thus, such ATM protocol network emulation allows higher layer application protocols to continue to be utilized with no modification.

Where the unmodified applications end and the ATM protocol network emulation begins is illustrated in FIG. 1 by ATM protocol network emulation demarcation 110 (the dashed line separating computers 102, 104, 106, and 108 (running some LAN compatible protocol on the network layer) from the ATM protocol network emulation of a standard LAN service interface (e.g., media access control layers of some standard local area network protocol)).

Figure 2:
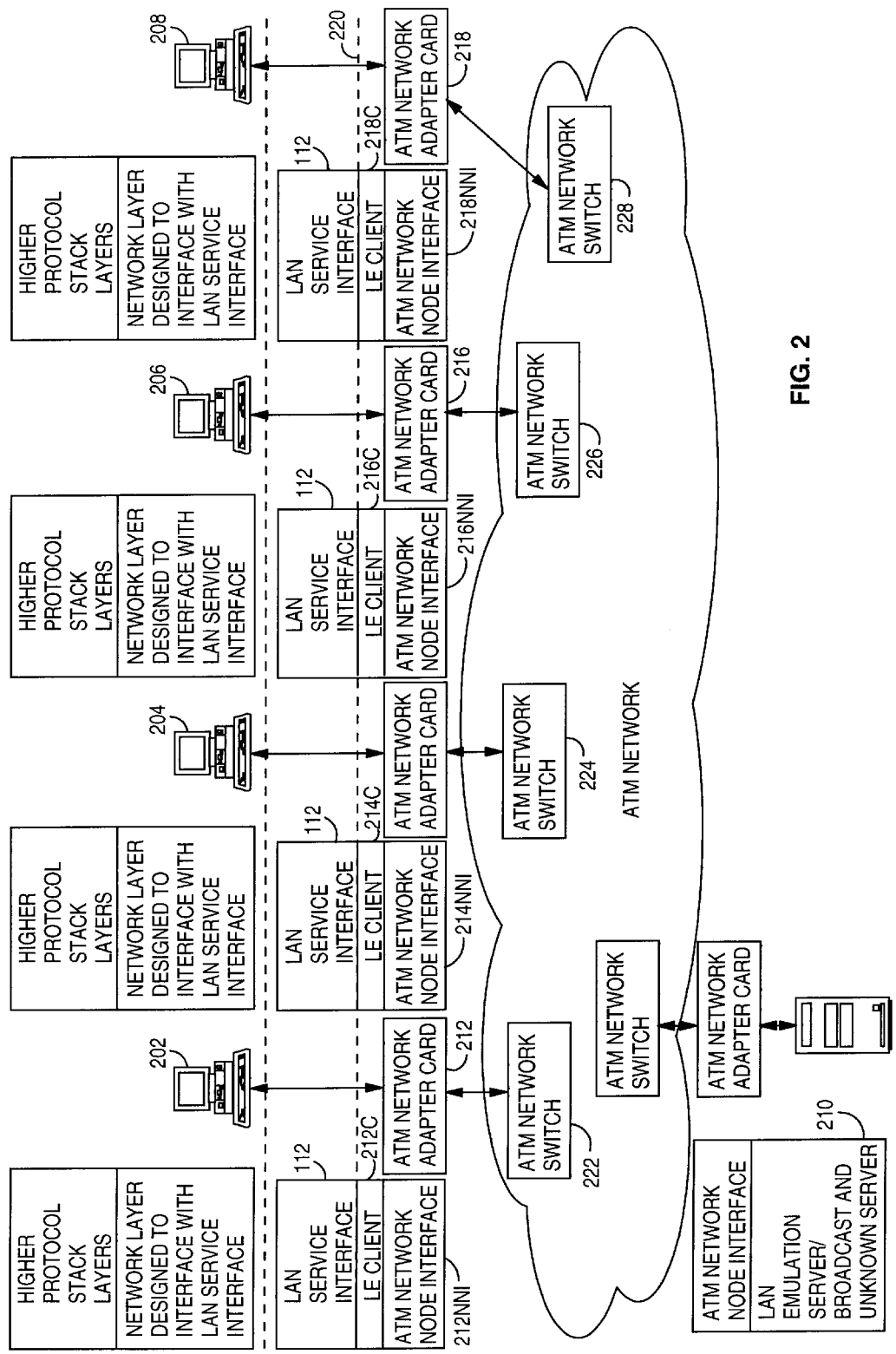
FIG. 2 gives a conceptual illustration of how the ATM protocol network provides Local Area Network emulation.

FIG. 2 gives an illustration of how ATM protocol provides Local Area Network Emulation. As will be shown in FIG. 2, ATM protocol provides Local Area Network Emulation by essentially doing two things: (1) slightly modifying the hardware and software of computing systems to be attached to an ATM network such that the computing systems can physically attach to and communicate with an ATM protocol network; and (2) providing hardware and software within the ATM protocol network itself which functions in conjunction with the modified attached computing systems to give rise to the appropriate emulation.

With respect to illustrating the modifications of the hardware of computing systems to be attached to the ATM network, shown in FIG. 2 are computers 202, 204, 206, and 208 to which are connected to ATM Network Adapter Cards 212, 214, 216, and 218, which are in turn connected (usually via fiber optic links) to ATM Network Switches 222, 224, 226, and 228. Such modifications allow computers 202, 204, 206, and 208 to physically attach to and physically exchange signals with ATM Network Switches 222, 224, 226, and 228 which are actually part of the ATM protocol network proper.

With respect to illustrating the modifications of the software of computing systems to be attached to an ATM network, shown in FIG. 2 are computers 202, 204, 206, and 208 in which is illustrated the existence of ATM protocol network emulation service interface 112, which interfaces with LE Clients 212C, 214C, 216C, and 218C. LE Clients 212C, 214C, 216C, and 218C interface with ATM Network Node Interfaces 212NNI, 214NNI, 216NNI, and 218NNI. ATM Network Node Interfaces 212NNI, 214NNI, 216NNI, and 218NNI provide the mechanism by which LE Clients 212C, 214C, 216C, and 218C communicate by and through ATM Network Adapter Cards 212, 214, 216, and 218 with ATM Network Switches 222, 224, 226, and 228.

LE Clients 212C, 214C, 216C, and 218C are under the control of LES/BUS 210. Such LE Client under the control of LES/BUS 210 constitute an ELAN proper; accordingly, shown in FIG. 2 is line 220 demarking the boundary of the ELAN shown, which is composed of the LE Client 212C, 214C, 216C, and 218C under the control of LES/BUS 210.

When an application program running on computer 202 desires to communicate with another application running on another computer attached to the ELAN demarcated by line 220, computer 202 specifies the MAC address of that other computer and passes it to ATM protocol network emulation service interface 112. Subsequently, ATM protocol network emulation service interface 112 passes the MAC address to LE Client 212C. LE Client 212C determines, from the received MAC address, what LAN function is to be emulated (e.g., that communication with a computer on the emulated LAN is to be established).

Subsequently, LE Client 212C via ATM protocol, queries LES 210 as to the ATM address of the device wherein the computer identified by the MAC address is located. This operation is known in the art as Lan Emulation Address Resolution Protocol (LE_ARP) Request.

In response to the LE_ARP Request, LES 210 consults its look up table (those in the art will recognize that a look up table is just one of the ways in which such could be accomplished) and responds with the ATM protocol network address wherein the LE Client associated with the MAC address resides. This operation is known in the art as LE_ARP Response.

Subsequent to receiving the ATM protocol address, LE Client 212 encapsulates the data utilizing appropriate ATM protocol and sends it to the correct LE Client associated with the MAC address. The receiving LE Client, upon receipt of such data, then strips off the ATM protocol and delivers the data to the destination computer, through ATM protocol network emulation service interface 112, in standard local area network protocol format. Subsequent ELAN communications proceed in much the same logical fashion. Thus, insofar as higher level applications running on computers 202, 204, 206, and 208 are concerned, they are connected into a standard service interface of a standard Local Area Network, and the fact that the underlying network is in fact an ATM protocol network is completely transparent, and hence of no consequence, to applications of computers 202, 204, 206, and 208 utilizing the emulated LAN.

Figure 3:
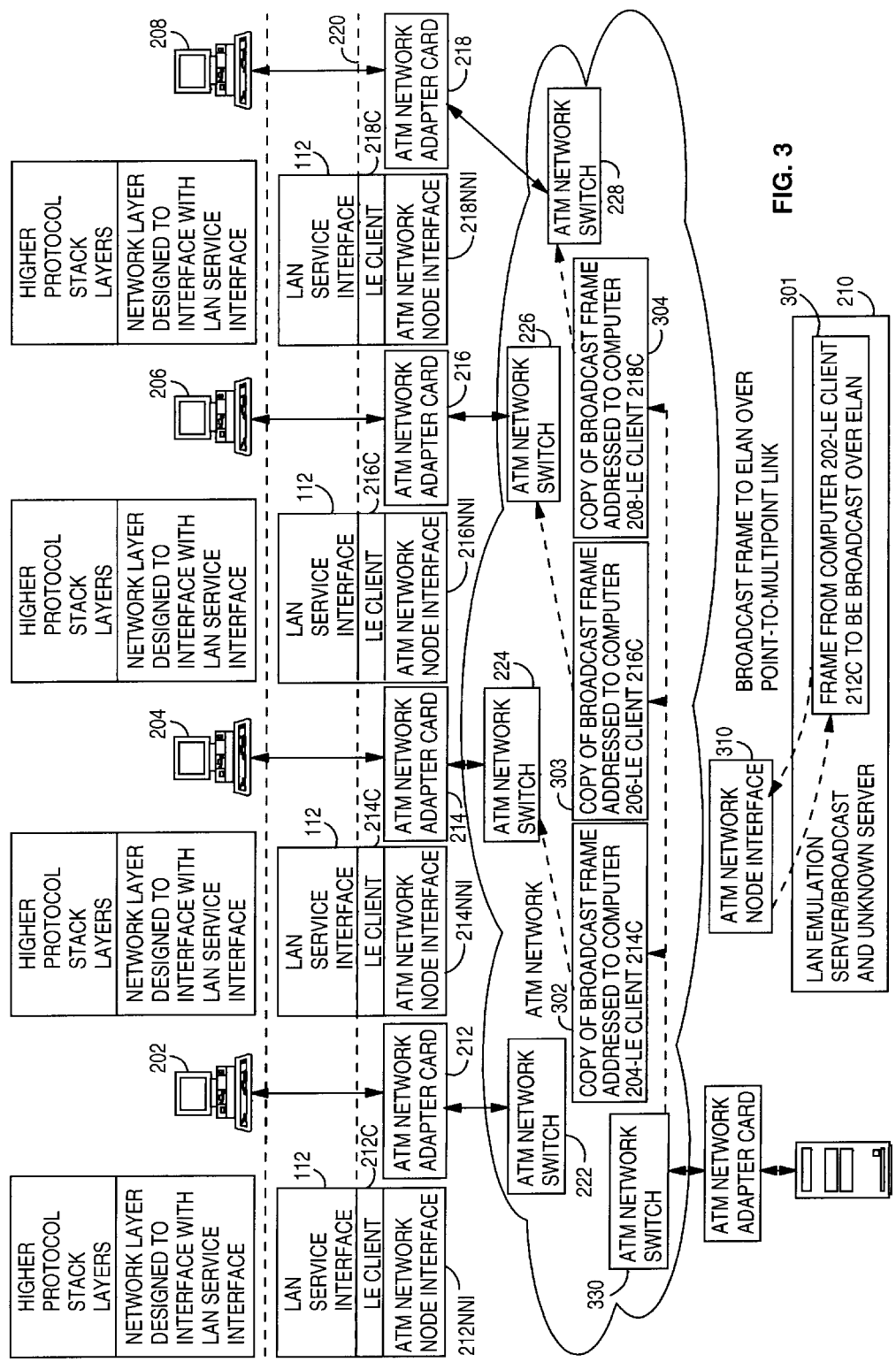
FIG. 3 gives a conceptual illustration of how the ATM protocol network provides a Local Area Network broadcast emulation.

It was set forth above that when an ELAN is to provide emulation of a broadcast function of a physical LAN, network efficiency may be decreased due to the monopolization of network resources by one or more devices over utilizing the broadcast function emulation. FIG. 3 will be used to illustrate how this can occur.

FIG. 3 gives a conceptual illustration of how the ATM protocol network provides Local Area Network broadcast emulation. In FIG. 3, parts with 100 and 200 series reference numerals function substantially the same as parts with those same reference numerals set forth in FIG. 1 and FIG. 2.

When computer 202 desires to broadcast to another computer on ELAN 220, computer 202 specifies the MAC address correspondent to "broadcast" and passes such broadcast address to ATM protocol network emulation service interface 112. Subsequently, ATM protocol network emulation service interface 112 passes the data with the MAC address to LE Client 212C. LE Client 212C then, via ATM protocol, sends the data with the MAC address to LES/BUS 210. Upon receipt of the data with the MAC address (shown in FIG. 3 as Frame from computer 202-LE Client 212C to be Broadcast over ELAN 301), LES/BUS 210 examines the MAC address and determines such corresponds to a LAN broadcast function.

As shown in FIG. 3, in response to such determination, LES/BUS 210 sends a request, through ATM Network Node Interface 310NNI, to ATM Network Switch 330 for ATM Network Switch 330 to broadcast the frame to the ELAN over a point-to-multipoint link.

In response to such request, shown is that ATM Network Switch 330 Duplicates the frame (those skilled in the art will appreciate that the information in the frame is duplicated rather than the frame itself) and addresses such copies to all LE Clients composing ELAN 220. Such copies are shown in FIG. 3 as Copy of Broadcast Frame Addressed to Computer 204-LE Client 214C 302, Copy of Broadcast Frame Addressed to Computer 206-LE Client 216C 303, and Copy of Broadcast Frame Addressed to Computer 208-LE Client 218C 304.

As shown in FIG. 3, once these copies are prepared and addressed, they are the transmitted through the ATM protocol network to the stations on the ELAN. Thus, the foregoing clearly demonstrates how the ELAN LES/BUS combination provides "broadcast" emulation.

Notice that the foregoing scheme of broadcast emulation basically multiplies the original transmission to be "broadcast" by at least a factor of how many other LE-Clients compose the ELAN. Add to this the required processing for the ATM Network Switch to duplicate the data and readdress it. From this, it can be seen that one or more computers utilizing the ELAN could easily monopolize the system and subsequently greatly disrupt data flow should such a station continually transmit broadcast requests.

Furthermore, examination of FIG. 3 will make clear that if the number of LE Clients composing the ELAN were much larger (e.g., two thousand LE Clients) then the sheer number of stations on the ELAN would make each "broadcast" emulation very expensive from both a computational and bandwidth perspective. Thus, in such a situation it would take many less successive "broadcast" requests from a particular LE Client or computer using an ELAN to overload or monopolize the system. As will be shown below, the present invention will alleviate the foregoing and other analogous problems.

Figure 4:
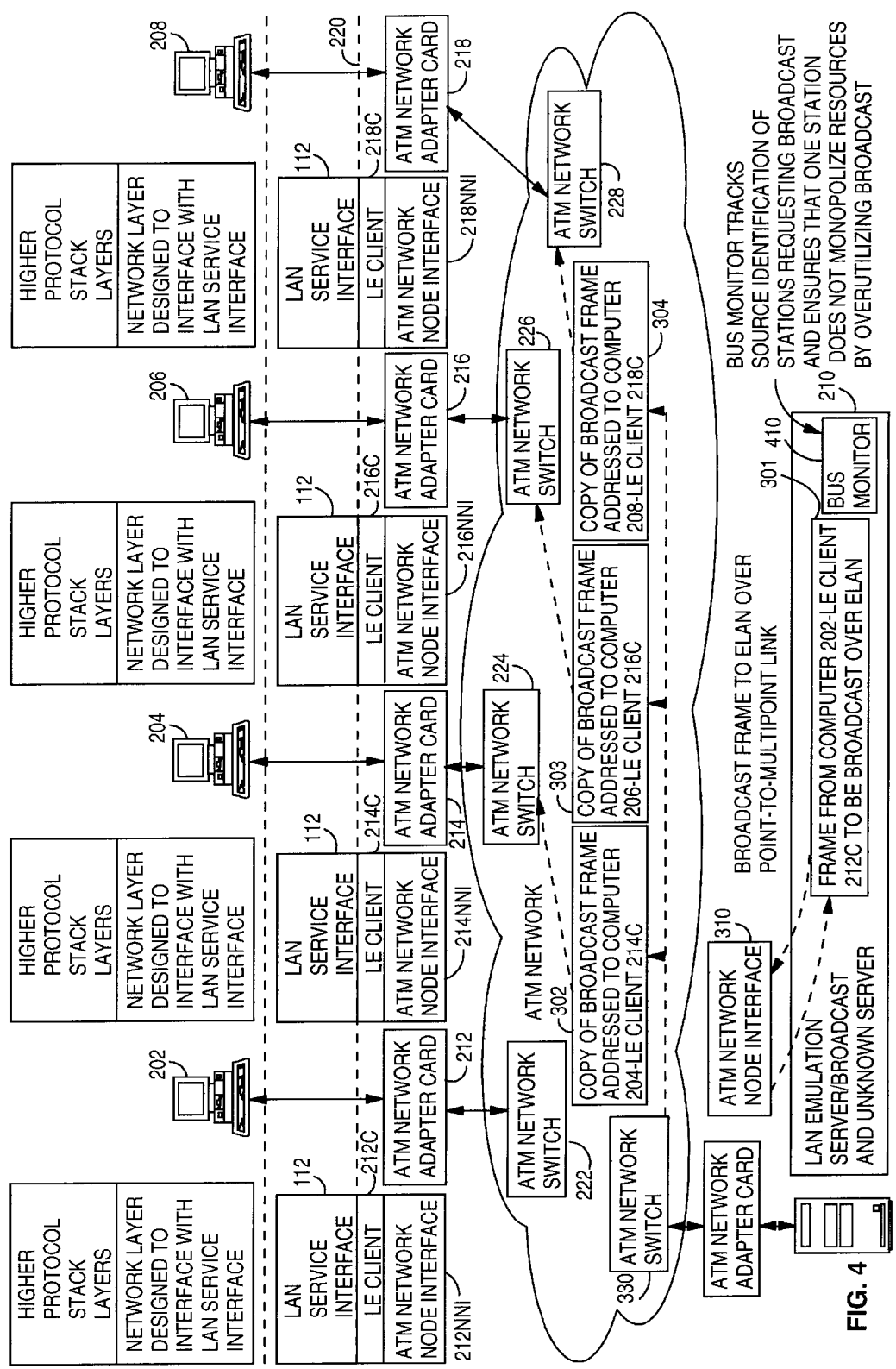
FIG. 4 is a partially schematic diagram which illustrates one illustrative embodiment of the present invention.

FIG. 4 is a partially schematic diagram which illustrates concepts whereby one illustrative embodiment of the present invention alleviates the problems arising from one or more devices monopolizing the resources of an emulated network. The partially schematic diagram of FIG. 4 is identical in operation in most respects with the partially schematic diagram shown in FIG. 3, with the exception that FIG. 4 has included within LES/BUS 210 a BUS monitor 410. In operation BUS monitor 410 monitors the traffic transiting LES/BUS 210, and if BUS monitor 410 deems that one or more entities are monopolizing the network resources, BUS monitor 410 will take corrective action. However, although BUS monitor 410 is shown in FIG. 4 as a component of BUS 210, it will be understood in the art that BUS monitor could just as easily be made a component of LES 310, or could be interposed as a stand alone entity between LES 310 and BUS 330.

In one illustrative embodiment, there are many types of information that may be monitored to determine whether one or more entities are monopolizing network resources. For example, in one illustrative embodiment BUS monitor 410 will track BUS users (e.g., "broadcast" emulation users) by their source MAC address and/or associated LE Client address over some period of time. Such tracked address data will then be compared to certain threshold criteria, to determine whether such tracked data indicates that one or more entities are monopolizing network resources. If such comparison indicates monopolization is occurring, then corrective action may be taken.

In another illustrated embodiment, the BUS monitor tracks the N heaviest users of the BUS by their source MAC address and associated LANE Client. Furthermore, the BUS monitor can be configured to monitor all BUS traffic, or to sample only a portion of BUS traffic. As the BUS monitor necessarily slows BUS performance, the user can configure the BUS monitor to trade sampling accuracy for BUS performance by lowering its sampling rates (e.g. only collect 10,000 samples per hour). Similarly, the user can configure the BUS monitor to only sample data during specified intervals with one example being to sample data for ten minutes each hour.

By sampling BUS traffic, network administrators can identify those stations abusing the broadcast service, and can then take action to correct the situation.

One example of the type of criteria indicative of resource monopolization which the BUS monitor could track would be the time frequency of occurrence of BUS use (e.g., "broadcast" requests) by a particular MAC address and associated LAN client. How frequent such use could be, would be dependent upon multiple different factors such as bandwidth capacity of equipment involved, the number of LE Clients, and the number of devices utilizing the ELAN. However, if one or more of such factors indicate emulated network resources were being monopolized, then corrective action could be taken. Examples of such corrective action could be refusing to honor BUS use request from the monopolizing device, queuing the BUS use requests from the monopolizing device and answering requests from other, non-monopolizing devices first, or report data back to a network management station for use by a network administrator.

Figure 5:
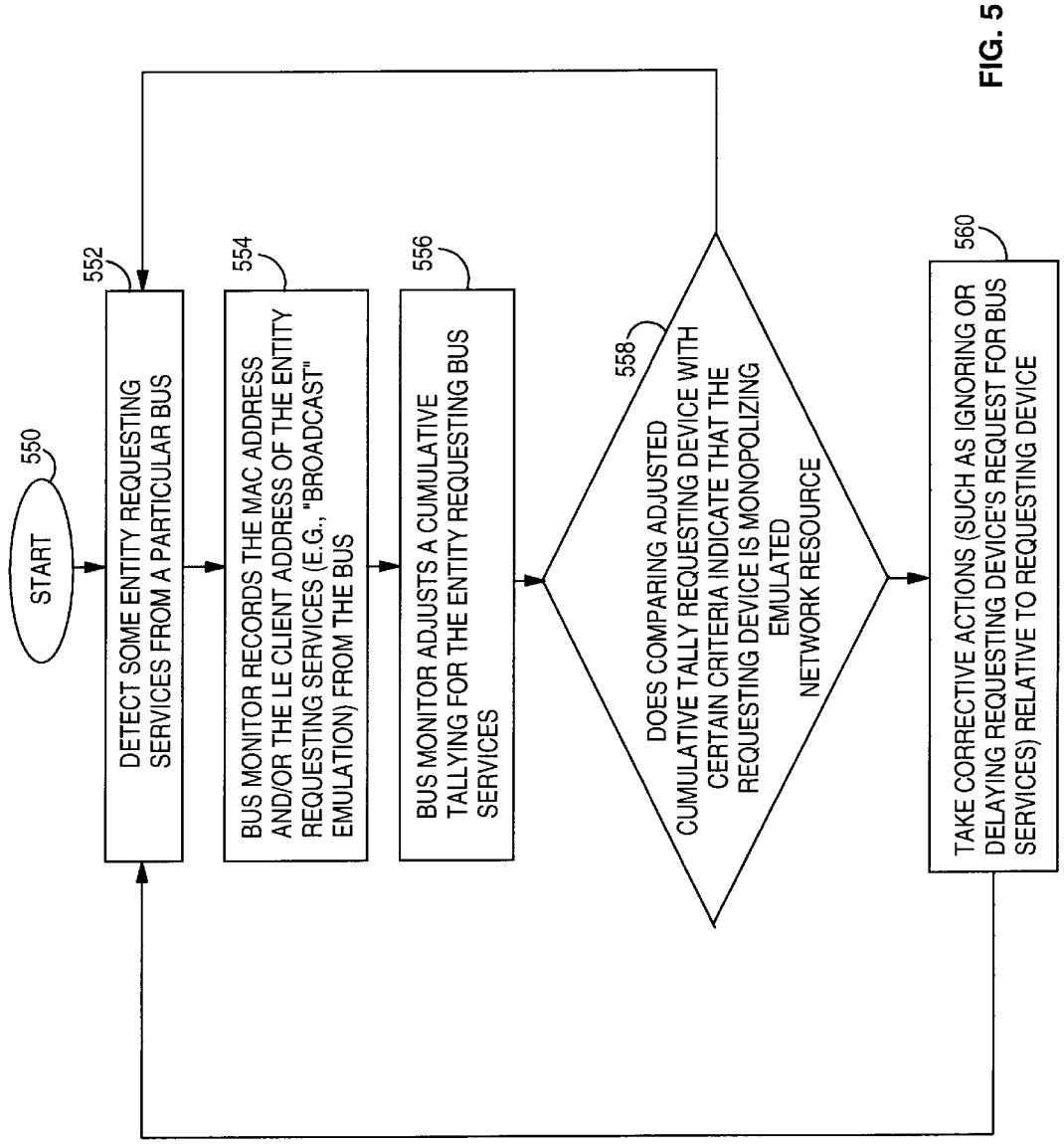
FIG. 5 depicts a high level logic flowchart further illustrating the embodiment of the present invention set forth in FIG. 4.

Refer now to FIG. 5. FIG. 5 depicts a high level logic flowchart further illustrating the embodiment of the present invention set forth in FIG. 4. Method step 550 shows the start of the process. Method step 552 depicts the detection of some entity requesting services from a particular BUS. Method step 554 illustrates that in response to such request, a BUS monitor records the MAC address and/or the LE Client address of the entity requesting services (e.g., "broadcast" emulation) from the BUS. Method step 556 illustrates that, in response to such request, the BUS monitor adjusts a cumulative tallying for the entity requesting bus services.

Subsequent to adjusting the cumulative tally, method step 558 shows the comparison of the adjusted cumulative tally of the requesting device with certain criteria indicate that the requesting device is monopolizing emulated network resource or precipitating emulated network overload. If the comparison indicates network monopolization or impending emulated network overload, then the process proceeds to method step 560 wherein corrective actions (of the type discussed above in relation to FIG. 4, such as ignoring or delaying the requesting device's request for BUS services) are engaged in. However, if the comparison indicates no monopolization or impending network overload, then the process returns to method step 552 and proceeds from that point.

Figure 6:
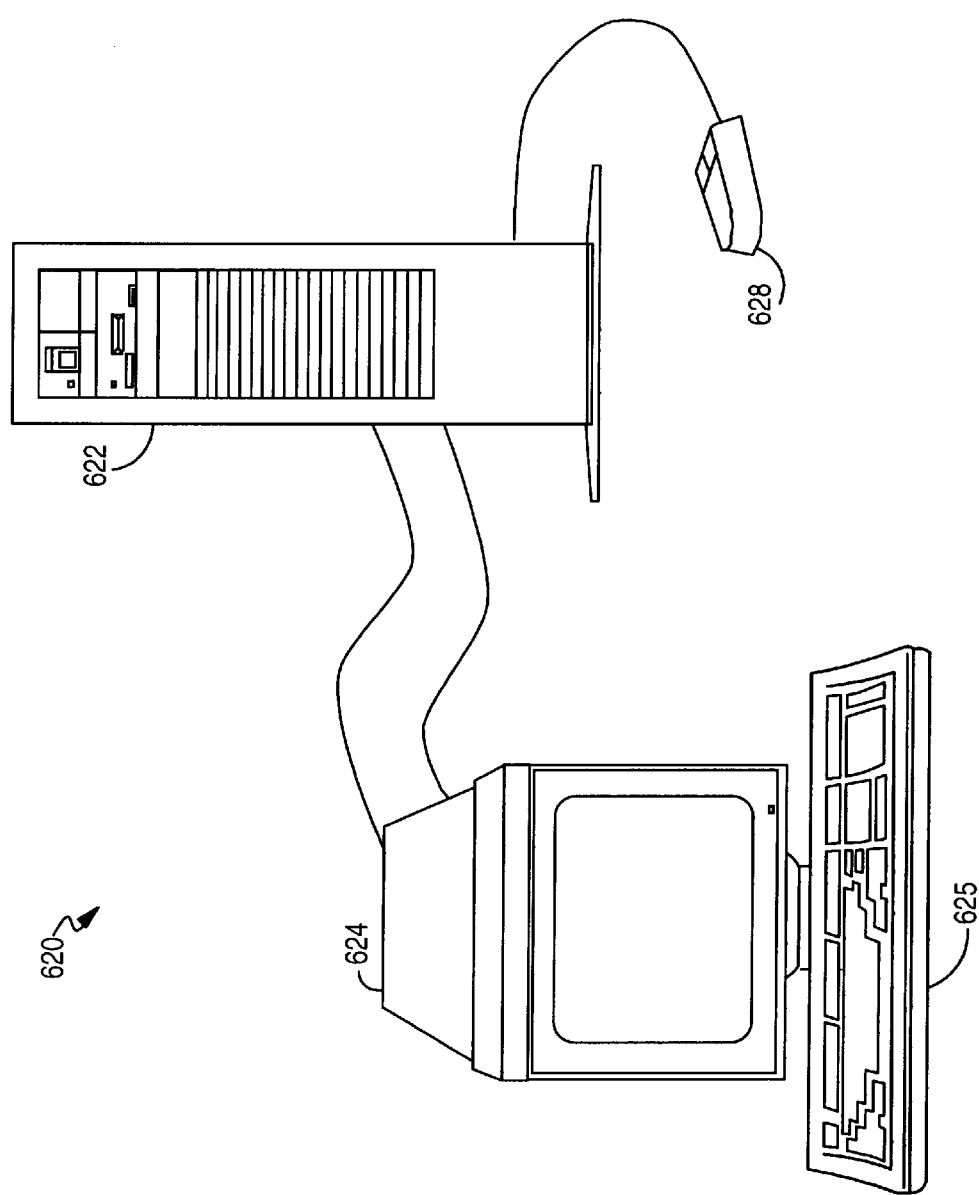
FIG. 6 depicts a pictorial representation of a data-processing system which can be utilized in accordance with the method and system of an illustrative embodiment of the present invention.

With reference now to the figures and in particular with reference now to FIG. 6, there is depicted a pictorial representation of a data-processing system which can be utilized in accordance with the method and system of an illustrative embodiment of the present invention. Those skilled in the art will recognize that while the foregoing figures have illustrated the method and systems of illustrative embodiments of the present invention as modules running on computers, or data processing systems, such methods and systems could just as easily be implemented in hardware, software, firmware or a combination of such. Also, as will be recognized by those skilled within the art, such data processing systems can be referred to alternatively by the following (non-exclusive) terms: computers, computing systems, routers or switches. The method and system provided by an illustrative embodiment of the present invention can be implemented with the data-processing system depicted in FIG. 6. A computer 620 is depicted which includes a system unit 622, a video display terminal 624, a keyboard 626, and a mouse 628. Computer 620 may be implemented utilizing any suitable computer such as the IBM RISC/6000 computer or IBM "Aptiva" computer, both products of International Business Machines Corporation, located in Armonk, N.Y. "RISC SYSTEM/6000" and "Aptiva" are trademarks of International Business Machines Corporation.

FIG. 7 is an illustration of a representative hardware environment which can be utilized in accordance with the method and system of an illustrative embodiment of the present invention. FIG. 7 depicts selected components in computer 620 in which an illustrative embodiment of the present invention may be implemented. System unit 622 includes a Central Processing Unit ("CPU") 731, such as a conventional microprocessor, and a number of other units interconnected via system bus 732. Computer 620 includes random-access memory ("RAM") 734, read-only memory ("ROM") 736, display adapter 737 for connecting system bus 732 to video display terminal 624, and I/O adapter 739 for connecting peripheral devices (e.g., disk and tape drives 733) to system bus 732. Video display terminal 624 is the visual output of computer 620, which can be a CRT-based video display well-known in the art of computer hardware. However, with a portable or notebook-based computer, video display terminal 624 can be replaced with an LCD-based or a gas plasma-based flat-panel display. Computer 620 further includes user interface adapter 740 for connecting keyboard 626, mouse 628, speaker 746, microphone 748, and/or other user interface devices, such as a touch screen device (not shown), to system bus 732. Communications adapter 749 connects computer 620 to a data-processing network.

Any suitable machine-readable media may retain the method and system of an illustrative embodiment of the present invention, such as RAM 734, ROM 736, a magnetic diskette, magnetic tape, or optical disk (the last three being located in disk and tape drives 733). Any suitable operating system and associated graphical user interface (e.g., Microsoft Windows) may direct CPU 731. For example, the AIX operating system and AIXwindows windowing system (i.e., graphical user interface) can direct CPU 731. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 731, such as touch-screen technology or human voice control. In addition, computer 620 includes a control program 751 which resides within computer storage 750. Control program 751 contains instructions that when executed on CPU 731 carries out the operations depicted in any of all of the logic flowchart of FIG. 5 and perform the operations indicated by any or all of the partially schematic diagrams of FIGS. 1, 2, 3, and 4 as described herein.

Those skilled in the art will appreciate that the hardware depicted in FIGS. 6 and 7 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for achieving enhanced performance in communications involving one or more emulated networks overlaid onto at least one base network, where said emulation is performed by one or more network emulation servers-broadcast and unknown servers, said method comprising the steps of:

monitoring addresses of data transiting said one or more network emulation servers-broadcast and unknown servers where said monitored addresses are indicative of one or more functions provided by said one or more emulated networks;

tracking said monitored addresses;

comparing said tracked monitored addresses, indicative of one or more functions provided by said one or more emulated networks, with one or more prespecified thresholds indicative of monopolization of resources of said at least one emulated network; and altering selected performance parameters of said at least one emulated network when said comparing indicates that one or more entities associated with said tracked addresses are monopolizing resources of said at least one emulated network such that communications involving said at least one emulated network are enhanced.

2. The method of claim 1, wherein said step of monitoring addresses further comprises the step of monitoring one or more addresses indicative of an emulation of Local Area Network broadcast.

3. The method of claim 1, wherein said step of tracking further comprises the step of tracking said monitored one or more addresses, indicative of one or more functions provided by said one or more emulated networks, per some specified unit of time.

4. The method of claim 1, wherein said step of comparing further comprises the step of comparing said tracked one or more addresses, indicative of one or more functions provided by said one or more emulated networks, with some prespecified threshold such that exceeding said prespecified threshold is indicative of monopolization of resources.

5. The method of claim 1, wherein said step of altering selected performance parameters further comprises the step of reducing responsiveness to requests involving entities deemed to be monopolizing network resources.

6. An apparatus for achieving enhanced performance in communications involving one or more emulated networks overlaid onto at least one base network, where said emulation is performed by one or more network emulation servers-broadcast and unknown servers, said apparatus comprising:

means for monitoring addresses of data transiting said one or more network emulation servers-broadcast and unknown servers where said monitored addresses are indicative of one or more functions provided by said one or more emulated networks;

means for tracking said monitored addresses;

means for comparing said tracked monitored addresses, indicative of one or more functions provided by said one or more emulated networks, with one or more prespecified thresholds indicative of monopolization of resources of said at least one emulated network; and means for altering selected performance parameters of said at least one emulated network when said comparing indicates that one or more entities associated with said tracked addresses are monopolizing resources of said at least one emulated network such that communications involving said at least one emulated network are enhanced.

7. The apparatus of claim 6, wherein said means for monitoring addresses further comprises means for monitoring one or more addresses indicative of an emulation of Local Area Network broadcast.

8. The apparatus of claim 6, wherein said means for tracking further comprises means for tracking said monitored one or more addresses, indicative of one or more functions provided by said one or more emulated networks, per some specified unit of time.

9. The apparatus of claim 6, wherein said means for comparing further comprises means for comparing said tracked one or more addresses, indicative of one or more functions provided by said one or more emulated networks, with some prespecified threshold such that exceeding said prespecified threshold is indicative of monopolization of resources.

10. The apparatus of claim 6, wherein said means for altering selected performance parameters further comprises means for reducing responsiveness to requests involving entities deemed to be monopolizing network resources.

11. A program product for achieving enhanced performance in communications involving one or more emulated networks overlaid onto at least one base network, where said emulation is performed by one or more network emulation servers-broadcast and unknown servers, said program product comprising:

means for monitoring addresses of data transiting said one or more network emulation servers-broadcast and unknown servers where said monitored addresses are indicative of one or more functions provided by said one or more emulated networks;

means for tracking said monitored addresses;

means for comparing said tracked monitored addresses, indicative of one or more functions provided by said one or more emulated networks, with one or more prespecified thresholds indicative of monopolization of resources of said at least one emulated network;

means for altering selected performance parameters of said at least one emulated network when said comparing indicates that one or more entities associated with said tracked addresses are monopolizing resources of said at least one emulated network such that communications involving said at least one emulated network are enhanced; and signal bearing media bearing said means for monitoring addresses, said means for tracking, said means for comparing, and said means for altering selected performance parameters.

12. The program product of claim 11 wherein said signal bearing media comprises recordable media.

13. The program product of claim 11 wherein said signal bearing media comprises transmission media.

14. The program product of claim 11, wherein said means for monitoring addresses further comprises means for monitoring one or more addresses indicative of an emulation of Local Area Network broadcast.

15. The program product of claim 11, wherein said means for tracking further comprises means for tracking said monitored one or more addresses, indicative of one or more functions provided by said one or more emulated networks, per some specified unit of time.

16. The program product of claim 11, wherein said means for comparing further comprises means for comparing said tracked one or more addresses, indicative of one or more functions provided by said one or more emulated networks, with some prespecified threshold such that exceeding said prespecified threshold is indicative of monopolization of resources.

17. The program product of claim 11, wherein said means for altering selected performance parameters further comprises means for reducing responsiveness to requests involving entities deemed to be monopolizing network resources.

* * * * *